(12) United States Patent
Raich et al.

(10) Patent No.: US 9,016,975 B2
(45) Date of Patent: *Apr. 28, 2015

(54) FASTENING DEVICE FOR FURNITURE FITTINGS

(75) Inventors: Oskar Raich, Bregenz (AT); Thomas Nagel, Hoechst (AT)

(73) Assignee: Julius Blum GmbH, Hoechst (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,255

(22) Filed: Apr. 6, 2012

(65) Prior Publication Data

US 2012/0195708 A1 Aug. 2, 2012

Related U.S. Application Data

(63) Continuation of application No. PCT/AT2010/000328, filed on Sep. 13, 2010.

(30) Foreign Application Priority Data

Oct. 12, 2009 (AT) .................................. A 1602/2009

(51) Int. Cl.
*F16B 3/06* (2006.01)
*A47B 95/00* (2006.01)
(Continued)

(52) U.S. Cl.
CPC . *A47B 95/00* (2013.01); *E05D 5/02* (2013.01); *E05D 5/08* (2013.01); *E05D 7/125* (2013.01); *E05Y 2600/504* (2013.01); *E05Y 2600/52* (2013.01); *E05Y 2600/622* (2013.01); *E05Y 2900/20* (2013.01); *F16B 12/20* (2013.01); *Y10S 403/13* (2013.01)

(58) Field of Classification Search
CPC ... F16B 13/063; F16B 13/066; F16B 13/0858
USPC ............ 403/322.4, 322.1, DIG. 12, DIG. 13, 403/369, 109.7, 322.3, 74.2, 374.5; 411/54, 411/57.1, 71, 72, 44, 56, 70, 61; 312/326, 312/327; 16/382, 383
See application file for complete search history.

(56) References Cited

U.S. PATENT DOCUMENTS 2,762,119 A * 9/1956 Jackson .......................... 411/61
3,460,429 A * 8/1969 Torre .............................. 411/56
(Continued)

FOREIGN PATENT DOCUMENTS

DE   295 06 600   9/1995
DE   200 02 994   5/2000
(Continued)

OTHER PUBLICATIONS

International Search Report issued Nov. 30, 2010 in International (PCT) Application No. PCT/AT2010/000328.
(Continued)

*Primary Examiner* — Michael P Ferguson
(74) *Attorney, Agent, or Firm* — Wenderoth, Lind & Ponack, L.L.P.

(57) ABSTRACT

A fastening device for furniture fittings on furniture parts which includes at least one dowel core that can be inserted into a hole of a furniture part. The dowel core can be arranged inside a dowel sleeve, and an actuating device moves the dowel sleeve relative to the dowel core. The dowel sleeve spreads on the dowel core and the dowel core is radially resilient.

24 Claims, 4 Drawing Sheets

(51) Int. Cl.
  *E05D 5/02* (2006.01)
  *E05D 5/08* (2006.01)
  *E05D 7/12* (2006.01)
  *F16B 12/20* (2006.01)

(56) References Cited

U.S. PATENT DOCUMENTS

| | | | | |
|---|---|---|---|---|
| 4,235,151 | A | * | 11/1980 | Udert et al. ............... 411/57.1 |
| 5,463,796 | A | * | 11/1995 | Brustle et al. ............... 16/383 |
| 5,613,796 | A | * | 3/1997 | Salice ...................... 403/374.5 |
| 5,685,678 | A | * | 11/1997 | Giannuzzi et al. ............. 411/55 |
| 5,895,103 | A | * | 4/1999 | Huber ...................... 312/348.4 |
| 6,361,241 | B1 | * | 3/2002 | Ferrari et al. ........ 403/DIG. 12 |
| 6,416,244 | B1 | | 7/2002 | Huber |
| 6,547,477 | B1 | * | 4/2003 | Huber et al. ............... 403/322.4 |

FOREIGN PATENT DOCUMENTS

| | | |
|---|---|---|
| DE | 199 62 955 | 7/2001 |
| DE | 102 29 300 | 3/2004 |
| EP | 0 599 056 | 6/1994 |
| EP | 1 054 168 | 11/2000 |
| GB | 2 357 327 | 6/2001 |
| JP | 1-35928 | 11/1989 |
| JP | 3103885 | 8/2004 |
| WO | 99/24723 | 5/1999 |

OTHER PUBLICATIONS

Austrian Patent Office completed Aug. 12, 2010 in Austrian Patent Application No. A 1602/2009.

* cited by examiner

FASTENING DEVICE FOR FURNITURE FITTINGS

CROSS-REFERENCE TO RELATED APPLICATIONS

This application is a Continuation of International No. PCT/AT2010/000328, filed Sep. 13, 2010, the entire disclosure of which is incorporated herein by reference.

BACKGROUND OF THE INVENTION (1) Field of the Invention

The invention relates to a fastening device for furniture fittings on furniture parts having a dowel core arranged inside a dowel sleeve, a furniture fitting having such a fastening device, a furniture part having such a furniture fitting and an item of furniture having such a furniture part.

(2) Description of the Related Art

The advantage of fastening furniture fittings using dowel-like clamping parts rather than fastening using screws lies in the fact that assembly can be carried out without tools, and so assembly times can be shorter. A further advantage of dowel-like clamping parts lies in the fact that, unlike screws, they cannot be "over-tightened"; when using screws, this can lead to worsening of the hold of the furniture fitting in the furniture part.

Thus, DE 200 02 994 U1 discloses a fitting for detachable fastening to a furniture part having a fitting body adjacent to the furniture part having at least one sleeve-like anchoring part that can be inserted into a drilled hole of the furniture part, wherein a clamping portion for the sleeve-like anchoring part that preferably bears on the fitting body is provided on the side of the fitting body facing away from the furniture part.

WO 1999/024723 A1 discloses a fitting for detachable fastening to a furniture part, having a fitting body adjacent to the furniture part, at least one dowel-like expansion sleeve that can be inserted into a drilled hole of the furniture part, having a plurality of axially offset retaining projections on its sheath, preferably having a conical tip and a peg-like expansion part for the expansion sleeve which projects out of the fitting body, wherein a clamping portion for the expansion sleeve which advantageously bears on the fitting body is arranged on the side of the fitting facing away from the furniture part.

EP 1 054 168 A2 and DE 295 06 600 U1 disclose further examples of the prior art.

The furniture fittings mentioned above suffer, however, from the disadvantage that the material of the furniture part is not taken into consideration as regards the transmission of load from the fastening device to the furniture part.

BRIEF SUMMARY OF THE INVENTION

The invention aims to avoid the disadvantage described above and to provide a fastening device for furniture fittings that is improved over the prior art, an improved furniture fitting, an improved furniture part and an improved item of furniture.

This aim is accomplished by a fastening device having the features described below, a furniture fitting having such a fastening device, a furniture part having such a fitting, and an item of furniture having such a furniture part.

The effect of such a resilient dowel core is such that when the furniture part is made from a hard material, this dowel core deforms inwardly, and when the furniture part is made from a soft material, the dowel core springs inwardly to a lesser extent. Thus, an increased, even hold is obtained in various materials such as hardwood, MDF, chipboard, softwood etc., since a constant closing pressure is applied to the actuating device and thus between the fastening device and the furniture part for different materials. The effect on the material tolerances of the furniture part is similar—some parts of the same material are somewhat harder, some are somewhat softer—this no longer has a negative effect on the hold of the furniture fitting in the furniture part.

Further advantageous embodiments of the invention are defined herein.

BRIEF DESCRIPTION OF THE DRAWINGS

Further details and advantages of the present invention will now be described in more detail with reference to the description of the figures below made with reference to the embodiments illustrated in the accompanying drawings in which.

DETAILED DESCRIPTION OF THE INVENTION

Figure 1A:
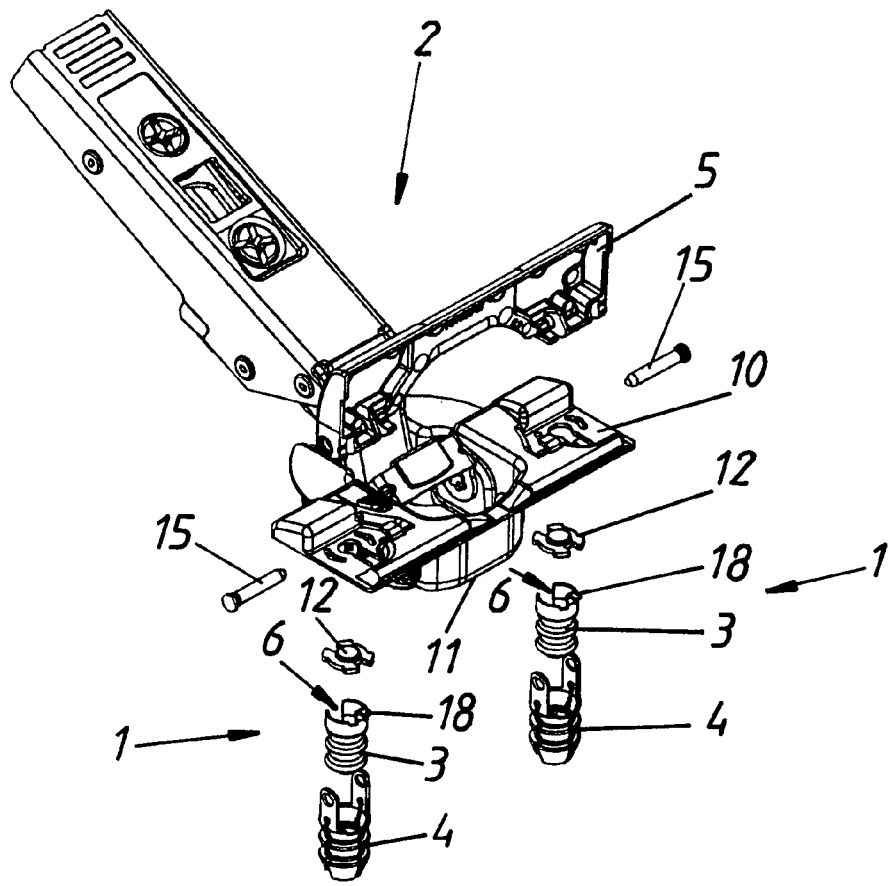
FIG. 1a shows a perspective exploded view of a furniture fitting.

FIG. 1a shows a furniture fitting 2 for a furniture part 13 (not shown), which is provided with a fastening device 1 that is inserted into two drilled holes 14 (not shown) of a furniture part 13. In this embodiment, the fastening device 1 has two dowel cores 3 and two dowel sleeves 4, which can be inserted into two drilled holes 14 of a furniture part 13. A spacer disk 12 is arranged between the dowel core 3 and the fastening flange 10 of the furniture fitting 2. Because of the pins 15, the dowel sleeve 4 can be drawn by the actuation device 5 in the direction of the fastening flange 10. The dowel core 3 has a longitudinal slit 6 that runs axially and continuously through the dowel core 3 and thus forms a cylindrical spring core sleeve. The material of the dowel core 3 and the dowel sleeve 4 is preferably a metal, most preferably spring steel. In a preferred embodiment, it is advantageous if the dowel sleeve 4 is formed from C67 spring steel and the dowel core 3 is formed from C60 spring steel. If the dowel sleeve 4 is drawn in the direction of the fastening flange 10 by means of the actuating device 5, then it is expanded by means of the dowel core 3, thus resulting in fastening the furniture fitting 2 in the drilled holes 14 of a furniture part 13 (see FIGS. 1b and 3b). Also in this embodiment, the dowel core 3 is arranged on the fastening flange 10. Between the dowel core 3 and the fastening flange 10 is a spacer disk 12, wherein a portion of the spacer disk 12 projects into the fastening flange 10 and another portion projects into the drilled hole 14. Thus, the spacer disk 12 can accommodate lateral forces—inter alia when the furniture part 13 is under load—and thus on the one hand stabilizes the dowel core 3 and on the other hand, it results in less deformation at the fastening flange 10, giving the system as a whole an increased draw. In this embodiment, the spacer disk 12, which is preferably provided with a dog 18, slots into the fastening flange 10 and thus is detachably fastened to the fastening flange 10. In this embodiment, the dowel sleeve 4 is constructed as a single piece, but in another embodiment the dowel sleeve 4 may also be formed from several parts.

Figure 1B:
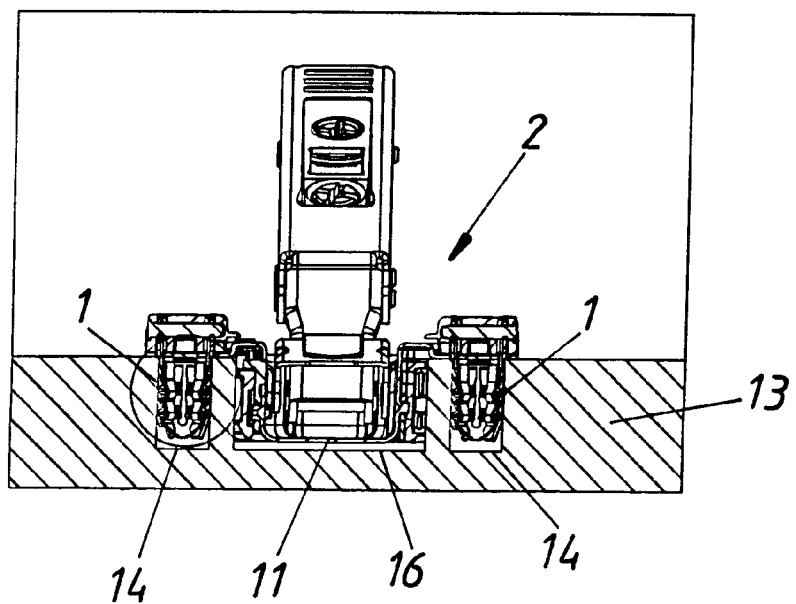
FIG. 1b shows a sectional front view of the fastening device of a furniture fitting.

FIG. 1b shows a furniture fitting 2 arranged in the drilled holes 14 of a furniture part 13. In this case, the fastening device 1 of the furniture fitting 2 is arranged in two drilled holes 14 which outlie the drilled hole 16 of the hinge cup 11.

Figure 2A:
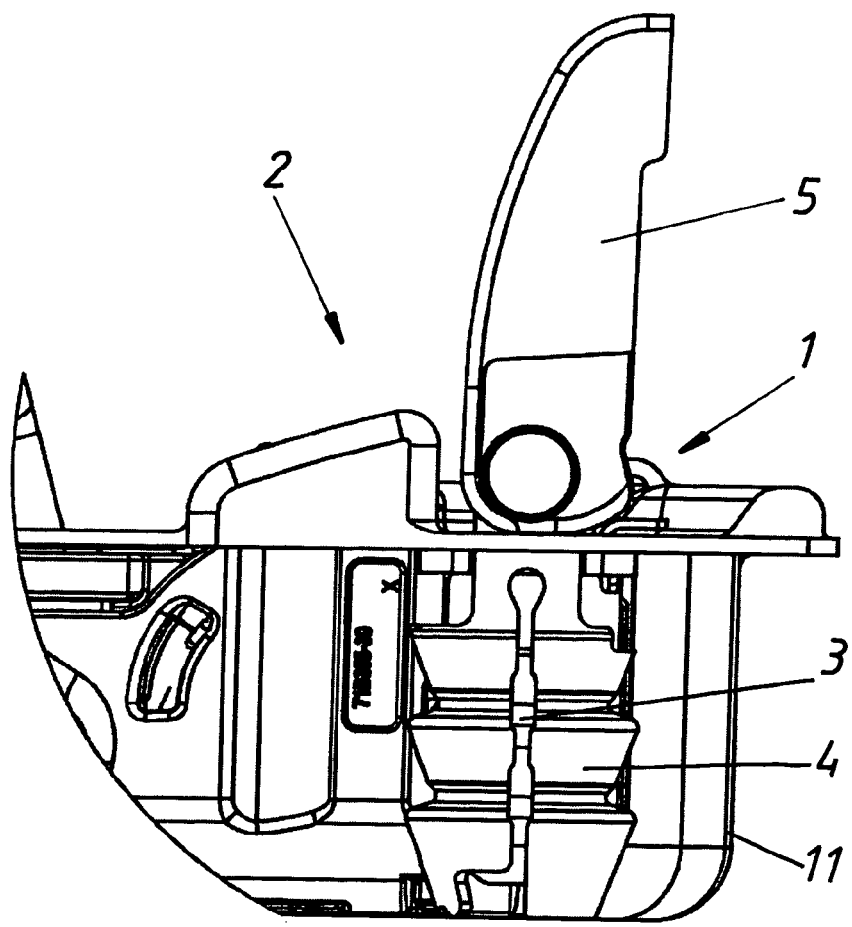
FIG. 2a shows a side view of an open fastening device.

FIG. 2a shows a furniture fitting 2 with a fastening device 1 with which the furniture fitting can be fastened in a furniture part 13 (not shown). In this case the fastening device 1 has an actuating device 5, which in this embodiment is formed as a hinged lever. In this case the dowel sleeve 4, which can be drawn by means of said lever, outlies the hinge cup 11.

Figure 2B:
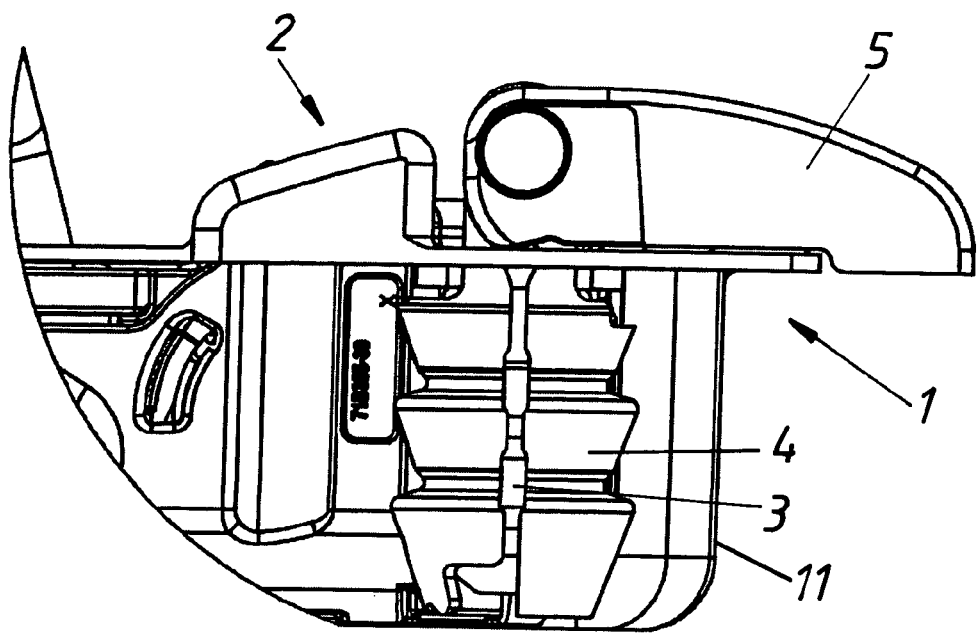
FIG. 2b shows a side view of a closed fastening device.

Thus, as can be seen in FIG. 2a, when the actuating device 5 is hinged into a horizontal position, as shown in FIG. 2b, then the dowel sleeve 4 is drawn by said actuating device 5 in the direction of the actuating device 5 and thus expands on the dowel core 3.

Figure 3A:
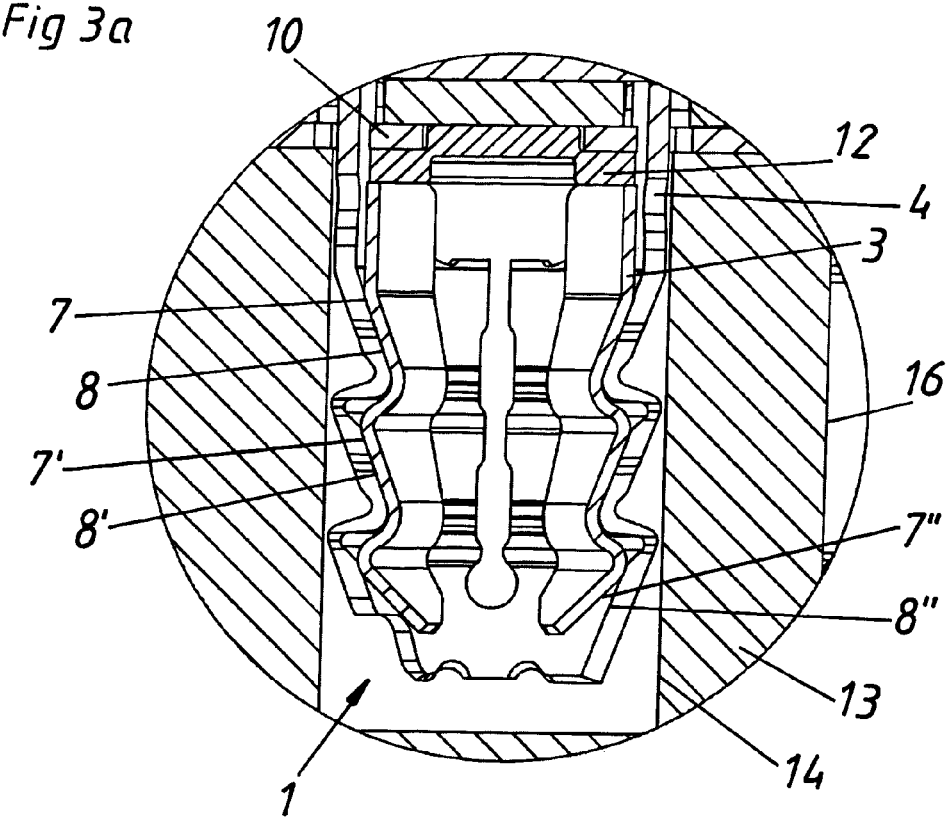
FIG. 3a shows a section through the drilled hole of a furniture part with an open fastening device.

FIG. 3a shows a section through a furniture part 13 and its drilled holes 14. In this drilled hole 14 there are only the dowel core 3, the spacer disk 12 and the dowel sleeve 4. The optional spacer disk 12 sits on the dowel core 3 and, when the dowel housing 4 is drawn over the dowel core 3, this means that the dowel core 3 is deformed less at the fastening flange 10, resulting in improved transmission of forces in the system as a whole.

In this embodiment both the dowel core 3 and the dowel sleeve 4 are constructed such that they are radially resilient and primarily consist of a metallic material. In addition, they have longitudinal slits; in this embodiment, the dowel core 3 is provided with a continuous longitudinal slit 6 (not shown) and the dowel sleeve 4 is provided with a plurality of discontinuous longitudinal slits. Both the dowel core 3 and the dowel sleeve 4 are provided with a plurality of axially offset inclined surfaces 7, 7', 7", 8, 8', 8". The term "axial direction" in this case means in the direction of the longitudinal axis of the drilled hole 14, which corresponds to the insertion direction of the dowel core 3 and the dowel sleeve 4 of the fastening device. Thus, the shape of the inner sheath surface 9 of the dowel sleeve 4 is essentially—in cross-section—corrugated, and the shape of the outer sheath surface 9' of the dowel core 3 is essentially—in cross-section—corrugated, wherein these two corrugated sheath surfaces 9, 9' match each other.

Figure 3B:
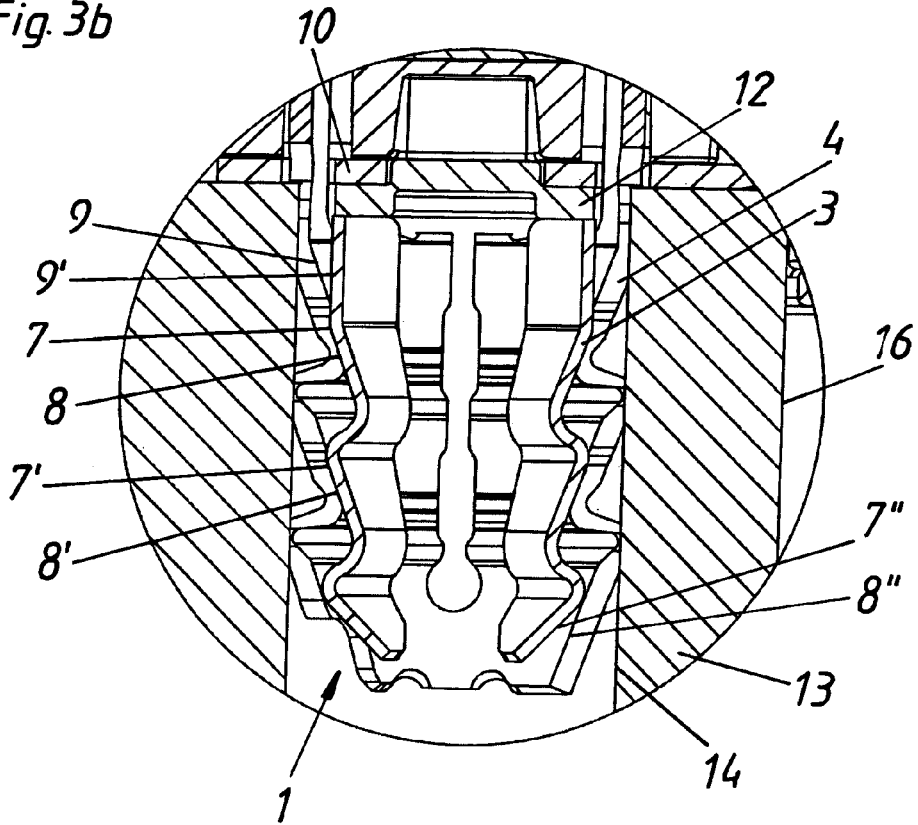
FIG. 3b shows a drilled hole of a furniture part with a closed fastening device.

FIG. 3b shows a dowel core 3 and a dowel sleeve 4 of a fastening device 1 as just described for FIG. 3a, with the exception that in FIG. 3b the fastening device 1 has been actuated using the actuating device 5 (see FIG. 2a and FIG. 2b, as it is not shown here). In this case, it is still only the dowel core 3 and the dowel sleeve 4 of the fastening device 1 that project into the drilled hole 14 of the furniture part 13, and the dowel core 3 is still provided with an optional spacer disk 12, which can accommodate lateral forces on the furniture fitting 2 when it is under load in order, inter alia, to result in less deformation of the dowel core 3 at the fastening flange 10.

By actuating the actuating device 5 (not shown), the dowel sleeve 4 is drawn in the direction of the fastening flange 10 and is expanded on the dowel core 3, thereby anchoring the fastening device 1 in the drilled hole 14 of the furniture part 13. Since the inclined surfaces 7, 7' of the dowel core 3 match the inclined surfaces 8, 8' of the dowel sleeve 4, essentially even expansion of the dowel sleeve 4 occurs at a plurality of axially offset locations. This continuous expansion of the dowel sleeve 4 means that material tolerances of the furniture part 13—some parts of the same material are somewhat harder, some are somewhat softer—are evened out and thus they do not have a negative effect on the hold of the furniture fitting 2 in the furniture part 13. Furthermore, the radially resilient dowel core 3 ensures that the hold of the furniture fitting 2 in various materials used to make the furniture part 13, such as hardwood, MDF, chipboard, softwood etc., is good, since when a hard material is used to make the furniture part 13, the resilient dowel core 3 deforms inwardly to a greater extent, but in contrast when a softer material is used to make the furniture part 13, the resilient dowel core 3 deforms to a lesser extent. Thus, independently of the material, a constant load is transmitted from the fastening device 1 to the furniture part 12 and nevertheless ensures sufficient hold of the furniture fitting 2 in the furniture part 13.

Both in the expanded condition and in the relaxed condition, the dowel core 3 and the dowel sleeve 4 are in constant surface contact, meaning that when the furniture part 13 is dynamically loaded, the resilient dowel core 3 keeps the fastening device 1 pressed against the furniture part 13 and thus the hold of the furniture fitting 2 in the drilled hole 14 of the furniture part 13 under load is enhanced.

By means of the continuous expansion, i.e. because the dowel sleeve 4 is expanded not just at its lower end, but the expansion occurs evenly along its sheath surface, then load transmission can also occur with drilled holes 14 of a furniture part 13 that are "too big", and an enhanced hold is ensured, as with regular drilled holes 14.

Furthermore, because even in the relaxed condition the dowel sleeve 4 and the dowel core 3 are in constant surface contact with each other, the fastening device 1 is held in its position, which means that it is possible to insert the furniture fitting 2 and its fastening device 1 easily into the drilled hole 14 of a furniture part 13, meaning that the furniture fitting 2 can be rapidly mounted in the furniture part 13.

Such a fastening device 1 thus has the positive effect of guaranteeing both a good hold of a furniture fitting 2 in various materials used to make a furniture part 13 and also that the material tolerances of the furniture part 13 do not have a negative effect on the hold of the furniture fitting 2. Furthermore, the force required to actuate the actuating device 5 is kept small, since the resilience of the dowel sleeve 4 and the dowel core 3 has a positive influence on force transmission.

Figure 4:
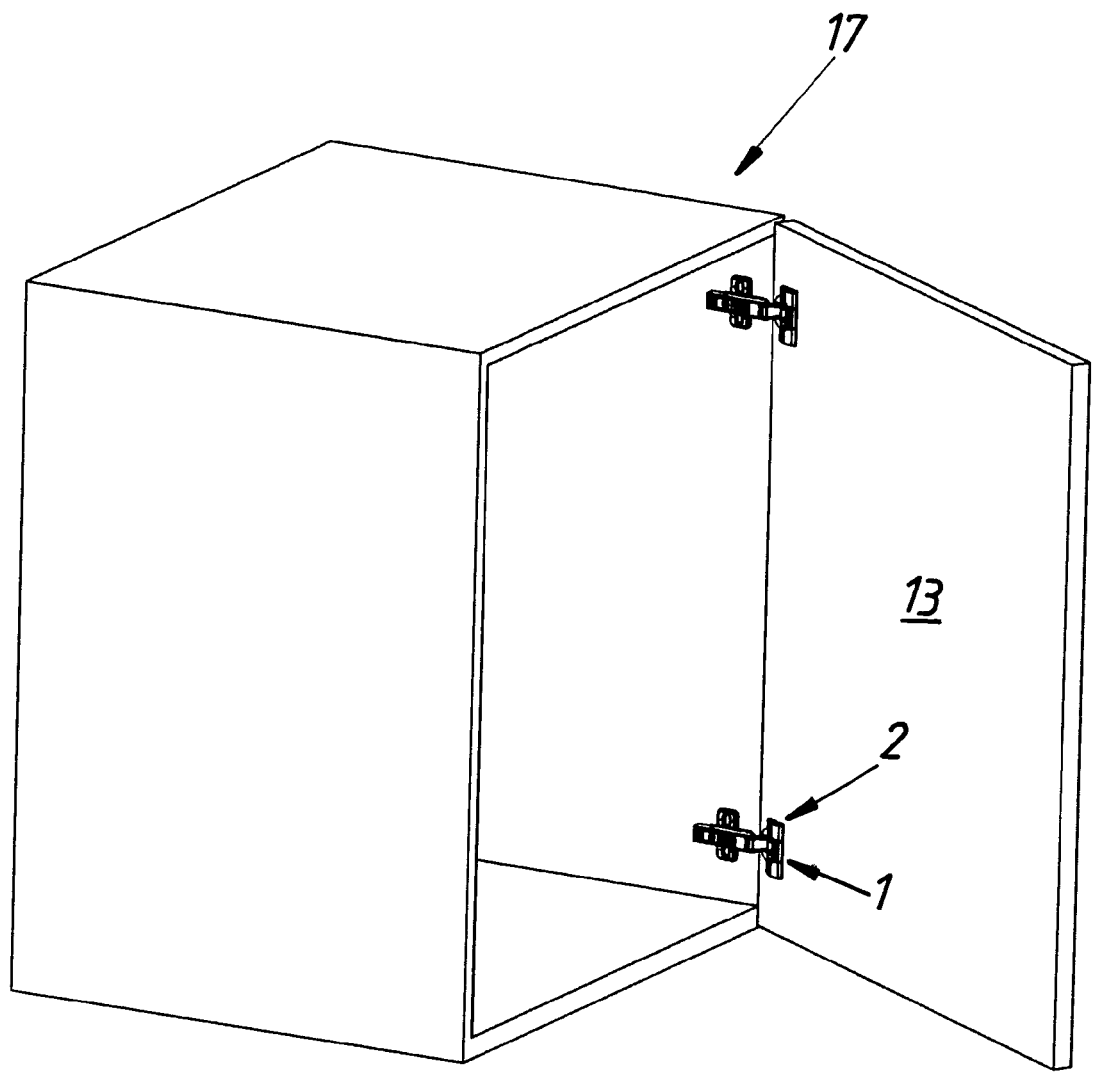
FIG. 4 shows a perspective view of a furniture part with furniture fittings.

FIG. 4 shows an item of furniture 17 with a furniture part 13, on which a furniture fitting 2 is applied by means of a fastening device 1.

Even though these embodiments show the fastening device 1 exclusively outlying the hinge cup 11, this should not be taken to constitute a restriction. Such a fastening device 1 may also be fastened in any drilled hole of a furniture part 13 in order to fasten a furniture fitting 2 in a furniture part 13.

The illustrated embodiments of fastening devices for furniture fittings used on furniture parts are clearly not limiting in nature, but are simply individual examples of the many possibilities in embodying the inventive concept in a fastening device for furniture fittings.

List of reference numerals:
1 fastening device
2 furniture fitting
3 dowel core
4 dowel sleeve
5 actuating device
6 longitudinal slit
7, 7', 7" inclined surface of dowel core 3
8, 8', 8" inclined surface of dowel sleeve 4
9 inner sheath surface of dowel sleeve 4
9' outer sheath surface of dowel core 3
10 fastening flange
11 hinge cup
12 spacer disk 13 furniture part
14 drilled hole
15 pin
16 drilled hole for hinge cup 11
17 piece of furniture
18 dog on dowel core 3

The invention claimed is:

1. A fastening device for furniture fittings on furniture parts, the device comprising:
   a radially resilient cylindrical dowel sleeve;
   a hollow cylindrical dowel core for being arranged inside the dowel sleeve and inserted into a drilled hole of a furniture part; and
   an actuating device configured to move the dowel sleeve relative to the dowel core, whereby the dowel sleeve is selectively changeable from a relaxed condition to a radially expanded condition,
   wherein the dowel core has a longitudinal slit in at least substantially an entire length of the dowel core, is made of spring steel, and is constructed such that it is radially resilient, and
   wherein the dowel sleeve and the dowel core include corresponding engagement surfaces on inner or outer annular sidewall surfaces, respectively, configured such that moving the dowel sleeve relative to the dowel core using the actuating device causes the dowel sleeve to expand on the dowel core,
   wherein the dowel sleeve and the dowel core are configured such that the engagement surface of the dowel core contacts the engagement surface of the dowel sleeve in the expanded condition and in the relaxed condition, and
   whereby relative axial movement of the dowel sleeve with respect to the dowel core, and radial resilience of the dowel core, causes a substantially even expansion of the dowel sleeve along the longitudinal extent of the dowel sleeve.

2. The device of claim 1, wherein the dowel core is constructed as a spring core sleeve.

3. The device of claim 2, wherein the dowel core is constructed as a spring core sleeve that is substantially cylindrical.

4. The device of claim 1, wherein the dowel core is provided with at least one additional longitudinal continuous slit.

5. The device of claim 1, wherein the engagement surface of the dowel core is provided with at least one inclined surface.

6. The device of claim 1, wherein the engagement surface of the dowel core is provided with a plurality of inclined surfaces that are offset in an axial direction.

7. The device of claim 1, wherein the dowel sleeve is at least partially constructed from a metallic material.

8. The device of claim 1, wherein the dowel sleeve is essentially completely constructed from a metallic material.

9. The device of claim 1, wherein the dowel sleeve is at least partially constructed from spring steel.

10. The device of claim 1, wherein the dowel sleeve is essentially completely constructed from spring steel.

11. The device of claim 1, wherein the engagement surface of the dowel sleeve is provided with at least one inclined surface.

12. The device of claim 1, wherein the engagement surface of the dowel sleeve is provided with a plurality of axially offset inclined surfaces.

13. The device of claim 1, wherein the corresponding engagement surfaces of the dowel core and the dowel sleeve each include two inclined surfaces that are offset in the axial direction, whereby relative movement of the dowel sleeve with respect to the dowel core causes a substantially even expansion of the dowel sleeve at two axially offset locations.

14. The device of claim 1, wherein the dowel sleeve has a corrugated inner sheath surface, and the dowel core has a corrugated outer sheath surface which matches the inner sheath surface of the dowel sleeve.

15. The device of claim 1, wherein the actuating device is a hinged lever.

16. A furniture fitting with a fastening device of claim 1.

17. The furniture fitting of claim 16, wherein the furniture fitting includes a fastening flange,
   wherein the dowel core is arranged on the fastening flange and the dowel sleeve is arranged such that it can be drawn by the actuating device in the direction of the fastening flange.

18. The furniture fitting of claim 16, wherein the dowel core is a first dowel core, the dowel sleeve is a first dowel sleeve, and
   wherein the furniture fitting further includes:
      a second dowel sleeve; and
      a second dowel core for being arranged inside the second dowel sleeve and inserted into another drilled hole of a furniture part,
      wherein the actuating device is configured to move the second dowel sleeve relative to the second dowel core,
      wherein the second dowel core is constructed such that it is radially resilient, and
      wherein the second dowel sleeve and the second dowel core are configured such that moving the second dowel sleeve relative to the second dowel core using the actuating device causes the second dowel sleeve to expand on the second dowel core.

19. The furniture fitting of claim 16, wherein the furniture fitting includes a hinge cup, and the fastening device is arranged outwardly of the hinge cup.

20. The furniture fitting of claim 16, wherein the furniture fitting includes a fastening flange,
   wherein the dowel core is arranged on the fastening flange and the dowel sleeve is arranged such that it can be drawn by the actuating device in the direction of the fastening flange, and
   wherein a spacer disk is arranged between the dowel core and the fastening flange.

21. A furniture part with a hole drilled therein, and the furniture fitting of claim 16 fastened to the furniture part with the dowel core and the dowel sleeve projecting into the hole,
   wherein only the dowel core and the dowel sleeve of the fastening device project into the hole.

22. An item of furniture comprising the furniture part of claim 21, wherein the furniture fitting couples the furniture part to another component of the item of furniture.

23. The device of claim 1, wherein:
   the dowel sleeve includes a longitudinal slit in at least substantially an entire length of the dowel sleeve.

24. A fastening device for furniture fittings on furniture parts, the device comprising:
   a radially resilient cylindrical dowel sleeve;
   a hollow cylindrical dowel core for being arranged inside the dowel sleeve and inserted into a drilled hole of a furniture part; and
   an actuating device configured to move the dowel sleeve relative to the dowel core, whereby the dowel sleeve is selectively changeable from a relaxed condition to a radially expanded condition, wherein the dowel core has a longitudinal slit in at least substantially an entire length of the dowel core, is made of spring steel, and is constructed such that it is radially resilient, and wherein the dowel sleeve and the dowel core are configured such that moving the dowel sleeve relative to the dowel core using the actuating device causes the dowel sleeve to expand on the dowel core, wherein the dowel core and the dowel sleeve each include inclined inner or outer annular sidewall surfaces, respectively, that are offset in the axial direction, whereby relative movement of the dowel sleeve with respect to the dowel core causes a radially outward expansion of the dowel sleeve at axially offset locations by causing the inclined surfaces of the dowel core to engage the inclined surfaces of the dowel sleeve, wherein the dowel sleeve and the dowel core are configured such that they contact each other in the expanded condition and in the relaxed condition, and wherein the inclined surfaces of the dowel sleeve and the dowel core are arranged such that the expansion of the dowel sleeve is substantially even over the entire longitudinal extent of the dowel sleeve disposed in the drilled hole.

* * * * *